United States Patent [19]

Klarhorst

[11] Patent Number: 5,358,352
[45] Date of Patent: Oct. 25, 1994

[54] SWIVEL JOINT FOR A SUPPORT ARM ADJUSTABLY RECEIVING AN APPLIANCE, LIGHTING FIXTURE OR THE LIKE

[76] Inventor: Guenter Klarhorst, Eisgrundstrasse 7, D-4800 Bielefeld 18, Fed. Rep. of Germany

[21] Appl. No.: 978,953

[22] Filed: Nov. 18, 1992

[30] Foreign Application Priority Data

May 21, 1992 [DE] Fed. Rep. of Germany ...... 4216767

[51] Int. Cl.$^5$ .................. F16C 11/10; F16M 11/08; F21Y 21/28
[52] U.S. Cl. ..................... 403/104; 403/106; 403/108; 403/263; 403/267; 403/332; 403/292; 403/296
[58] Field of Search ............... 403/104, 106, 107, 108, 403/103, 83, 84, 245, 263, 361; 248/281.1, 280.1, 282, 283, 289.1, 284, 291, 185; 362/402, 413, 419, 427; 16/329, 330, 279, 257, 375, 223, 328, 329; 174/86; 604/259; 602/26

[56] References Cited

U.S. PATENT DOCUMENTS

| | | | |
|---|---|---|---|
| 1,410,325 | 3/1922 | Kupferman | 362/427 |
| 2,608,367 | 8/1952 | Boltuch | 362/413 |
| 2,921,773 | 1/1960 | Hoelzer | 403/107 |
| 3,533,648 | 10/1970 | Thieberger | 403/107 |
| 4,545,555 | 10/1985 | Koch | 248/280.1 |
| 4,666,328 | 5/1987 | Ryu | 16/329 |
| 4,748,671 | 5/1988 | Wiegel | 16/257 |
| 4,929,113 | 5/1990 | Sheu | 16/329 |

FOREIGN PATENT DOCUMENTS

2658838 7/1978 Fed. Rep. of Germany .
8400753 5/1984 Fed. Rep. of Germany .

Primary Examiner—Randolph A. Reese
Assistant Examiner—Anthony Knight
Attorney, Agent, or Firm—Browdy and Neimark

[57] ABSTRACT

The swivel joint for a support arm adjustably receiving an appliance, lighting fixture or the like, in which hoses, cables, lines or the like can be passed through the support arm and the swivel joint and can be fixed to the swivel joint and to the support arm; the swivel joint has two joint shells (3, 4), which are limitedly rotatable about a common axis (2) and are held together axially, each having one tubular outrigger arm (5, 6) for connection to one support tube segment (7) each, and both joint shells (3, 4) can be released by an actuation element (8) to move them into various rotary positions and can be locked in the particular rotated position. The actuation element is a manually actuatable pushbutton (8), and an axially displaceable, spring-loaded blocking device (9) that cooperates in a form-fitting and/or force-locking fashion with both joint shells (3, 4) in the joint shell blocking position and with only one joint shell (3) in the joint shell release position is disposed in both joint shells (3, 4), and the pushbutton (8) is connected to the blocking device in a force-locking fashion.

20 Claims, 4 Drawing Sheets

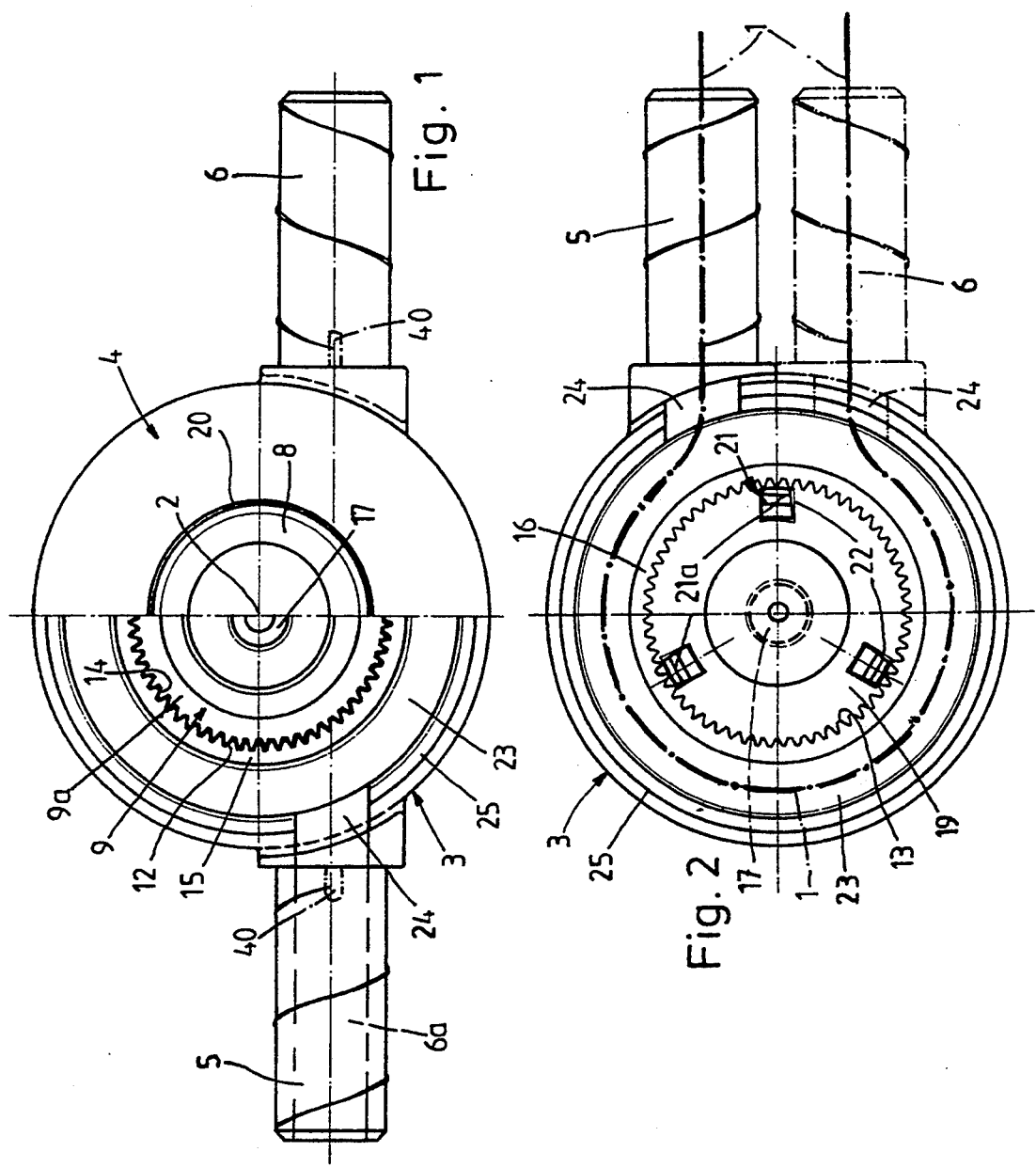

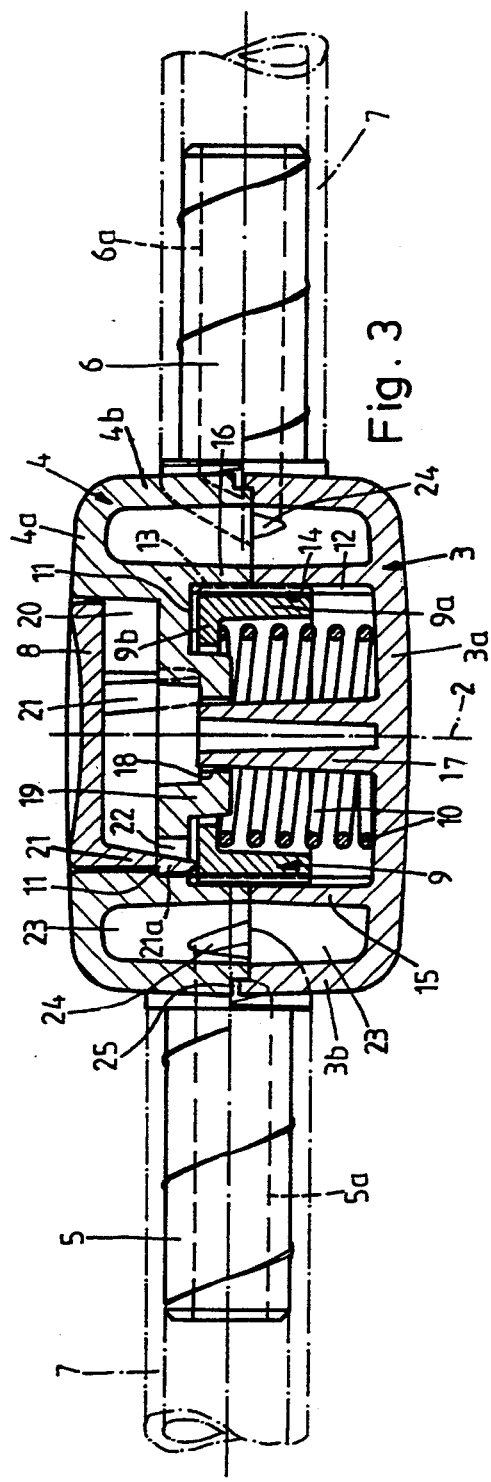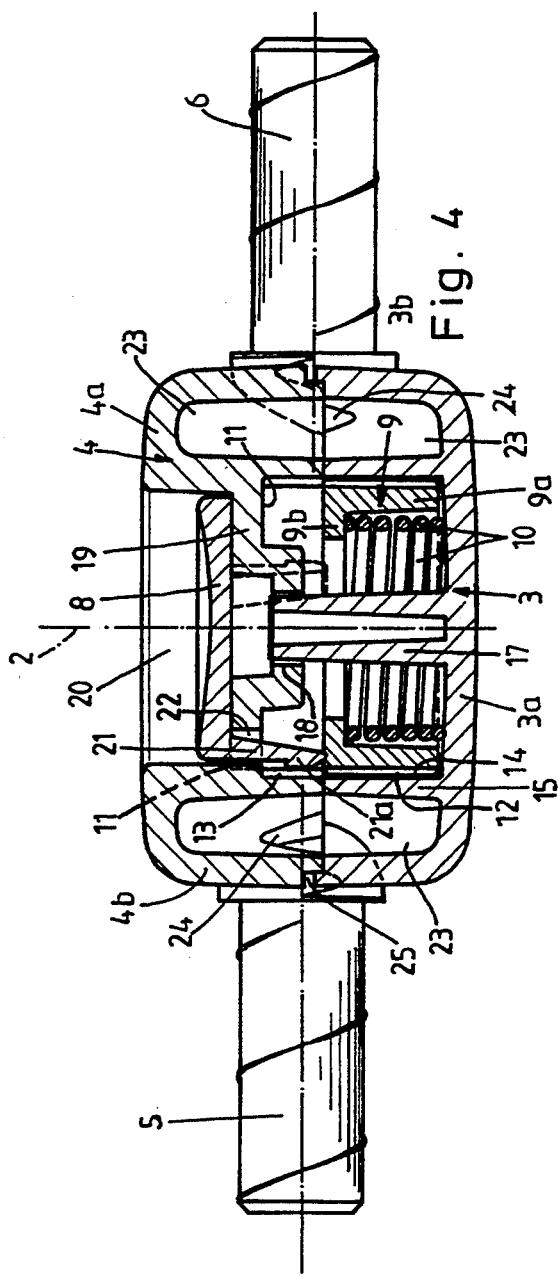

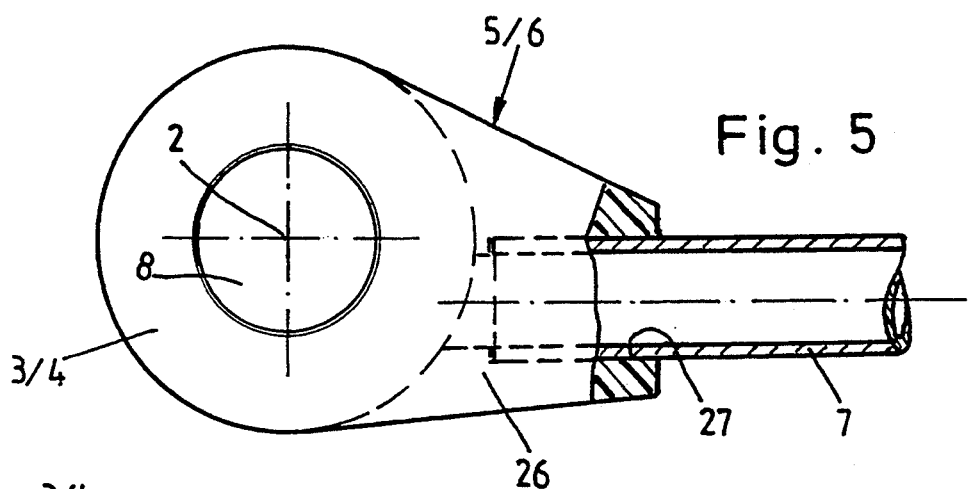
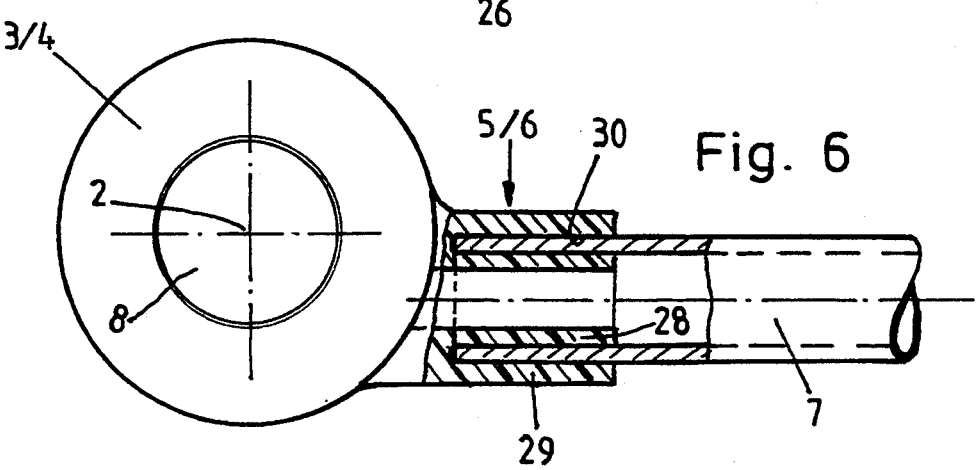
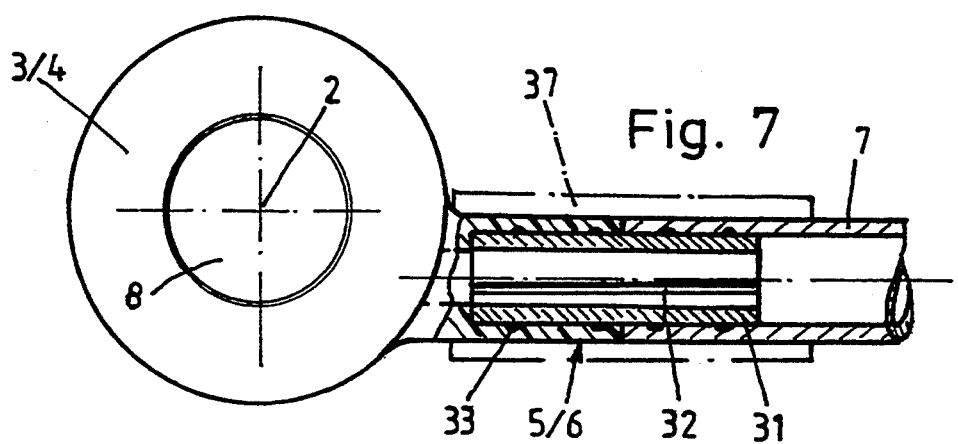
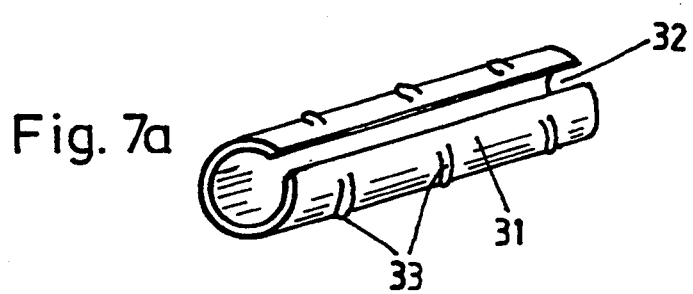

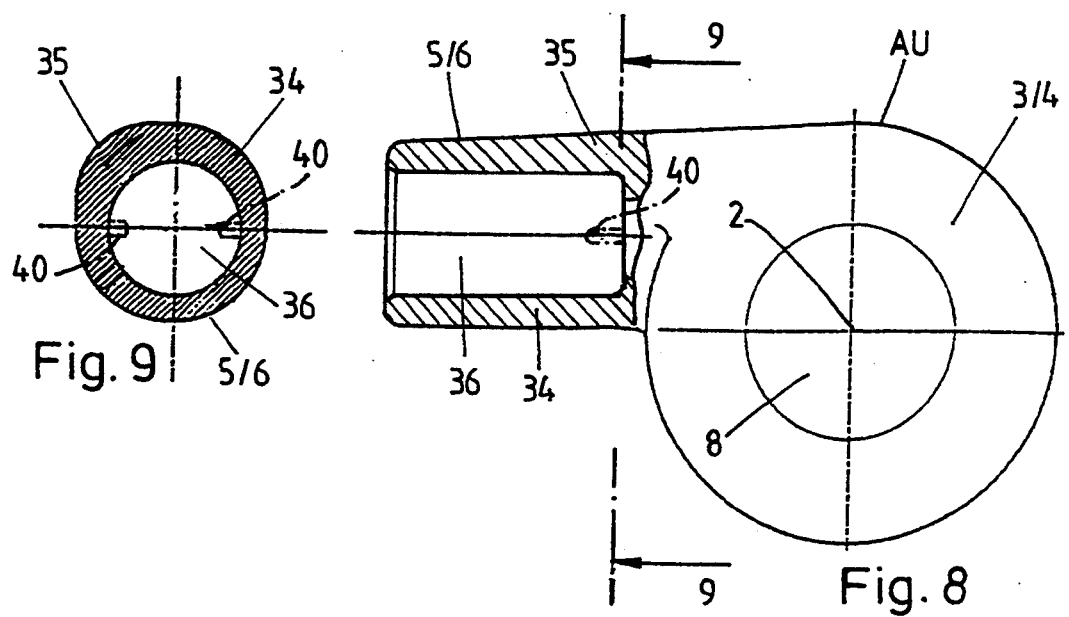

SWIVEL JOINT FOR A SUPPORT ARM ADJUSTABLY RECEIVING AN APPLIANCE, LIGHTING FIXTURE OR THE LIKE

BACKGROUND OF THE INVENTION

The invention relates to a swivel joint for a support arm adjustably receiving an appliance, lighting fixture or the like, in which hoses, cables, lines or the like can be passed through the support arm and the swivel joint and can be fixed to the swivel joint and to the support arm. The swivel joint has two joint shells, which are rotatable about a common axis and are held together axially. Each joint shell has one tubular outrigger arm for connection to a support tube segment. Both joint shells can be released by an actuation element to move them into various rotary positions and can be locked in the particular rotated position.

PRIOR ART

Swivel joints constructed in this way have become known in support arms for floor lamps or wall-mounted lighting fixtures. The joint shells rotatable relative to one another are fixed relative to one another in the particular rotated position by a screw, acting as an actuating element.

However, in terms of manipulation, the adjustment of the shells is unfavorable, because both hands always have to be used, and the screw must be loosened and tightened again by hand, which takes several turns and thus a relatively long time.

A similar swivel joint has also become known from German Utility Model DE-GM 86 19 907, in which a sliding and compensation ring that is intended to compensate for the play between the joint shells and simultaneously produce self-locking in the rotated positions is disposed about the pivot axis of the two joint shells.

No actuating element is present. Instead, the shells are rotated in an infinitely graduated manner relative to one another, and in the particular rotated position, the sliding and compensation ring is intended to fix this position. However, if a blow unintentionally strikes the support arms, or if major strains occur in the swivel joint, this construction may not be adequate.

SUMMARY OBJECTIVE OF THE INVENTION

The object of the invention is to equip a swivel joint, structured as indicated above, in a simple manner with a conveniently and rapidly effected adjustment with arbitrary angular degrees and with secure, automatic locking of the particular adjusted position.

The swivel joint for support arms according to the invention is constructed simply and economically from only a few individual parts and can be mounted easily and conveniently.

In this swivel joint, a specially designed adjustment is provided that is actuated with one hand, which permits undoing the locking of the two joint shells relative to one another, then permits an adjustment with arbitrary angular degrees, and finally produces an automatic locking of the adjusted position once established.

To that end, the two joint shells are equipped on the inside with teeth, and meshing axially displaceably with these teeth is a blocking device, with a set of teeth. This blocking device is actuated by a pushbutton that is supported on a joint shell and is displaceable axially along the pivot axis of the joint shells. The blocking device and the pushbutton are automatically held in a position of repose by a compression spring, and this position is at the same time the blocked position. In this blocked position, the blocking device, with its outer teeth, meshes with the inner teeth of two cylinder rings of the two joint shells. Pressure upon the pushbutton counter to the force of the compression spring shifts the pushbutton along with the blocking element in the axial direction, and the blocking element is pushed with its outer teeth out of the inner teeth of one joint shell and into the inner teeth of the second joint shell, so that the joint shell having the pushbutton is released, and then both joint shells can be axially adjusted relative to one another.

When the pushbutton is released, the blocking position is automatically resumed as a result of the compression spring.

This provides extremely simple manipulation and easy operation to adjust the swivel joint, which can be done with one hand.

Moreover, the outside of this swivel joint has a closed shape with no protruding parts, making for an esthetically attractive appearance.

In addition, in its joint shells and the adjoining outrigger arms, the swivel joint is embodied in tubular form, such that an uninterrupted, continuous receiving chamber for hoses, cables or the like is open from one outrigger arm to the other, and these hoses, cables or the like can be passed conveniently through the swivel joint from one support arm segment to the other and can be adequately accommodated and moved in the swivel joint. This swivel joint is versatile and is especially advantageous for medical equipment for placing of medical hoses, lines or the like.

The support arm can preferably be used in the field of medical technology with the swivel joint or joints disposed on or in it. The generally typical medical hoses are laid and fixed on the outside of the support arm and swivel joint, especially by retaining means such as holder clamps, retaining clamps, clips or the like that are locked into a detent position on the support arm and also hold the hose by a detent connection. These hoses are used preferentially in respiratory and aerosol therapy.

The hoses, placed on the outside of the support arm through the retainers and forming a unit with the support arm and the swivel joints, carry an aerosol, intended for the patient, from the equipment to the patient by evaporation or ultrasonic micronation.

This support arm with swivel joints is also especially suitable for reading lights mounted on hospital beds, because on the one hand it enables easy, individual adjustment, and on the other it affords the maximum possible safety in the position set, and precludes danger from unintentional lowering and hence damage to the bedding from catching fire because of the warm light and the heat.

BRIEF DESCRIPTION OF THE DRAWINGS

The drawings show an exemplary embodiment of the invention, which is described in detail below. Shown are:

FIG. 1, a side view of a swivel joint, formed of two joint shells each with one outrigger arm on which support arm segments can be connected with one joint shell half cut off and releasing a blocking device in the other joint shell, the joint shells being shown rotated relative to one another in the extended position of the two outrigger arms;

FIG. 2, a side view on the interior of a joint shell with a cylinder ring with teeth on the inside and with the outrigger arm of the second joint shell shown in dot-dashed lines and rotated by 180° from FIG. 1;

FIG. 3, a longitudinal section through the swivel joint in the blocking position of the blocking device and the position of repose of a pushbutton for actuating the blocking device;

FIG. 4, a longitudinal section through the swivel joint in the release position, displaced by the pushbutton, of the blocking device for rotating the two joint shells relative to one another;

FIGS. 5-7, views in fragmentary section of a joint shell, with variants for connecting the support tube segment to the joint shell;

FIG. 7a shows a perspective view of a connecting spring tube;

FIG. 8, a side view in fragmentary section through a joint shell with tube connectors for a support tube segment;

FIG. 9, a cross section through the tube connectors of the joint shell taken along the line of FIG. 8.

DETAILED DESCRIPTION OF THE PREFERRED EMBODIMENT

As shown in FIGS. 1-3, the swivel joint (4) for a support arm receiving an appliance; lighting fixture or the like in an adjustable manner where hoses (1), cables lines or the like can be passed through the arm and swivel joint, has two joint shells (3, 4), limitedly rotatable about a common axis (2) and held together in the axial direction, each shell having a tubular outrigger arm (5, 6) to which one support tube segment (7) each can be connected. Arm 5 is integrally engaged to shell 3 and arm 6 integrally engaged to shell 4 to permit each of the arms (5, 6) to rotate in relation to each other as shells (3, 4) are rotated. Both joint shells (3, 4) can be released by an actuation element (8) for movement to various rotated positions and can be locked in the particular rotated position.

As shown in FIGS. 3 and 4, this actuation element (8) is embodied as a manually actuatable pushbutton (8), and an axially displaceable, spring-loaded blocking device (9) that cooperates in a form-fitting and/or force-locking fashion with both joint shells (3, 4) in the joint shell blocking position (FIG. 3) and with only one joint shell (3) in the joint shell release position (FIG. 4). This blocking device is disposed in both joint shells (3, 4), and the pushbutton (8) is connected to the blocking device in a force-locking fashion.

The blocking device (9) and the pushbutton (8) are pushed by a compression spring (10) counter to a stop (11) of one shell (4) into a position of repose in which the blocking device (9) connects the two joint shells (3, 4) in a rotation-blocking manner. Upon actuation of the pushbutton (8) counter to the force of the compression spring (10), the blocking device (9) can be moved into one joint shell (3) into the joint shell release position, for rotation of the joint shells (3, 4) counter to one another.

The two joint shells (3, 4) and the blocking device (9) are equipped with intermeshing sets of teeth (12, 13, 14). The blocking device (9) has teeth (14), which mesh with the teeth (12, 13) of both joint shells when the joint shells are in blocking position, but only mesh with the teeth (12) of joint shell (3), when the joint shells are in release position.

The two joint shells (3, 4) each have on their inside a concentric cylinder ring (15, 16), rising from the shell bottom, each ring having a set of axially parallel inner teeth (12, 13), and the blocking device (9) is formed by a cylinder ring (9a) with axially parallel outer teeth (14) and an abutment rim (9b) on its face end for the compression spring (10). Cylinder ring (9a) is displaceably supported by its outer teeth (1) in the inner teeth (12, 13) of the two joint shell cylinder rings (15, 16) and its outer teeth (14) are axially no longer than the teeth (12) of one joint shell (3) that receive the toothed cylinder ring (9a) in the release position of the two joint shells (3, 4). The set of outer teeth (14) extends over the entire axial length of the cylinder ring (9a), and the blocking device (9) is embodied with an axial length matching the axial length of the cylinder ring (15) of the joint shell (3).

The blocking device (9) and the compression spring (10) are located coaxially with the pivot axis (2) of the two joint shells (3, 4), and the compression spring (10) is disposed about the pivot axis (2) and in the blocking device (9). The compression spring (10) is engaged at one end on the inwardly retracted abutment rim (9b) of the blocking device (9) and at the other end on the joint shell (3). Joint shell (3) receives in the rotated position of the two joint shells (3, 4), the blocking device (9), which is supported specifically on the shell bottom.

The pivot axis (2) for the two joint shells (3, 4) is formed by a concentric hollow connecting tang (17) on one joint shell (3), and a hole (18), surrounding the tang on the free end, of a false bottom (19) provide in the cylinder ring (16) of the other joint shell (4). The connecting tang (18) and the false bottom (19) are rotatably joined by a connecting means (not shown), such as a screw, and at the same time form the pivot and connecting axis for the two joint shells (3, 4). The connecting means in screw form reaches through the hole (18) and into the hollow connecting tang (2) and is supported with its head on the false bottom (19). The false bottom (19) is formed in a recessed fashion relative to the outside (shell bottom) of the joint shell (4), forms a receptacle and motion chamber (20) in this joint shell (4) for the pushbutton (8). This pushbutton (8) has a plurality of detent hooks (21) which movably reaches through recesses (22) of the false bottom (19) and is supported, in the blocking position of the two joint shells (3, 4), behind stops (11) in the region of these recesses (22) of the joint shell (4).

The pushbutton (8) is formed by a flat pressure head of circular outline with three detent hooks (21), which are disposed uniformly distributed over the circumferences protruding in the direction of the pivot axis, and which have abutment protrusions (21a) on their free ends. These abutment protrusions (21a) —as FIG. 3 shows —rest behind the stops (11) in the blocking position of the two joint shells (3, 4).

The outer and inner sets of teeth (12, 13, 14) of the joint shells (3, 4) and of the blocking device (9) are formed by identically finely spaced toothing. As a result, locking the joint shells (3, 4) against rotation can be done with a high number of parts at respectively small rotary angles, so that sensitive adjustment is thus attained. The rotational adjustment of the joint shells (3, 4) is within a rotary angle range of approximately 270°.

Each of the two joint shells (3, 4) each have one encompassing receiving chamber (23) around their respective cylinder rings (15, 16) that forms a common receiving chamber (23). Both outrigger arms (5, 6) are continuously connected to this receiving chamber (23)

by their conduits (5a, 6a), each via a respective recess (24) in the associated joint shell (3, 4) to which each is engaged, so that the hose (1) can be passed from a support tube segment (7) through the conduit (5a) of one outrigger arm (5) and the recess (24) into the cheer (23) of both joint shells (3, 4), around the coaxially abutting cylinder rings (15, 16) and out of the recess (24) into the conduit (6a) of the other outrigger arm (6) to reach the second support tube segment (7), Upon rotation of the joint shells (3, 4) relative to one another, the encompassing cheer (23) affords sufficient space and freedom of motion for the hose (1) or the like.

Each joint shell (3, 4), with their associated tubular outrigger arm (5, 6), cylinder ring (15, 16) and false bottom (19); the blocking device (9); and the pushbutton (8), having detent hooks (21), are all formed integrally of plastic.

The two shells (3, 4) mesh with one another in a torsionally guided manner with interlocking rims (25) formed onto their abutting shell rims, so that this annular interlocking guide (25) likewise forms a pivot axis coaxial to the axis (2).

In the position of FIG. 3, in which the two joint shells (3, 4) are locked in their mutually rotated adjustment, the compression spring (10) has displaced the blocking device (9) and the pushbutton (8), resting on it with its detent hooks (21), into a position of repose, and the abutment protrusions (21a) rest on the stops (11) of the joint shells (4), and the blocking device (9) is pressed against these protrusions (21a), so that both parts (8, 9) are retained in this terminal position under spring tension. With its outer teeth (14), the axially displaced blocking device (9) meshes with the inner teeth (12, 13) of both joint shells (3, 4) and locks them against rotation.

The option also exists that only the false bottom (19) acts as a stop (11) for the position of repose, so that the blocking device (9) rests on it, or alternatively both the joint shell (4) and the false bottom (19) function as stop 11.

To adjust the support arms (arm segments 7) into an elongated position (FIG. 1) or parallel position (FIG. 2) or an arbitrary angular position relative no one another, pressure is exerted by hand on the pushbutton (8), displacing it into the swivel joint counter to the force of the compression spring (10) via protrusions (21a) of the detent hooks (21) that are likewise axially displaced. The blocking device (9) is displaced axially counter to the spring force and in the process displaced out of the teeth (13) of the joint shell (4), thereupon with its full axial length entering the teeth (12) of the other joint shell (3). The joint shell (4) is now exposed and disengaged from the blocking device (9), and both joint shells (3, 4) and their associated outrigger arm (5, 6) can be rotated axially counter to one another with arbitrary angle sizes. This can be done with one hand, by grasping the swivel joint with one hand, simultaneously actuating the pushbutton (8) with a finger, and at the same time, the joint shell (4) containing the pushbutton (8). The support arm segment (7) can, thereby, be swiveled relative to the joint shell (3) having the fixed support arm segment (7).

When the pushbutton (8) is released, the blocking device (9) is automatically pushed back into the blocking position by the spring (10), and the teeth (12) mesh with both sets of teeth (13, 14). Likewise, via the blocking device (9) as it is displaced, the pushbutton (8) is pushed back into the position of repose and kept there by spring tension, against its stops (11).

In terms of their installation, the two joint shells (3, 4) are rotatably joined in their connecting and pivot axis (2, 17, 18) by the connecting element from the motion chamber (20). Next, the pushbutton (8) is inserted into the chamber (20) and extends lockingly through the recesses (22) with its detent hooks (21), thereby being retained in the false bottom (19) in such a manner that it cannot fall out.

As shown in FIG. 3, the outrigger arm (5/6) of the two joint shells (3/4) is formed by a formed-on tube connector, onto each of which one support segment (7) is slipped.

As shown in FIG. 5, the outrigger arm (5/6) is embodied as a conical or wedge-shaped part (26), formed separately onto each joint shell (3/4), having an insertion hole (27) into which the support tube segment (7) is inserted.

Moreover, as shown in FIG. 6, the outrigger arm (5/6) can be formed by a tube connector (28) and a bush (29) disposed around it. The tube connector (28) and the bush (29) are separately formed onto each joint shell (3/4) and receive the inserted support tube segment (7) in the annular conduit (30) formed between the two parts (28, 29), with a large contact area on the inside and outside and hence with stability.

According to the further version of FIGS. 7 and 7a, the outrigger arm (5/6) is formed by a tube connector formed onto each joint shell (3/4), and the support tube segment (7) makes a butt joint in front of this tube connector (5/6) and is retained on the joint shell (3/4) by means of a cylindrical, longitudinally slit (32) spring tube (31) that is inserted into the tube connector (5/6) and the support tube segment (7) and has retaining protrusions (33) formed onto its outside.

Furthermore, the support tube segment (7) can form a butt joint on the tube connector formed onto each joint shell (3/4) and be held on the joint shell (3/4) by a hose clamp (34) engaging the outside of the tube connector (5/6) and support tube segment (7), as shown in dot-dashed lines in FIG. 7.

In the further embodiment of FIGS. 8 and 9, the outrigger arm (5/6) of each joint shell (3/4) is formed by a formed-on tube connector (34), with a wall reinforcement (35) of asymmetrical cross section, in the form of a thickened wall region into which a support tube (7) is inserted.

The wall reinforcement (35) is preferentially located on the outside of the swivel joint and merges without forming a shoulder with the outer circumference (AU) of the joint shell (3/4).

The tube connector (34) is disposed with its wall reinforcement (35) eccentrically about the insertion hole (36) for the support arm segment (7) and has an elliptical cross section, as FIG. 9 clearly shows.

As a result of the wall reinforcement (35), the tube connector (34) is provided with great stability at the transition to the joint shell (3/4) and can absorb even major forces without damage in the case of long support tube segments (7),

I claim:

1. Pipe-shaped extension arms fastened to a swivel joint having a cable lead therethrough, said swivel joint comprising, two joint shells, said two joint shells being limitedly rotatable about a common axis and held together axially, each of said two joint shells having one tubular outrigger arm for connection to one of each of said pipe-shaped extension arms, actuation element means adjustably engaged to said two joint shells for permitting rotation of said two joint shells in relation to each other and locking said two joint shells in a particular rotated position, said actuation element means having a manually actuatable pushbutton (8) and an axially displaceable spring-loaded blocking device (9), said blocking device (9) cooperatively engaged in a form-filling and/or force-locking fashion with both said two joint shells (3, 4) in a blocking position where rotation of said two joint shells (3, 4) is blocked and with only one of said two joint shells (3) in a release position where rotation of said two joint shells is possible, said actuation element means being disposed in both said two joint shells (3, 4), and said pushbutton (8) being connected to said blocking device in a force-locking fashion, wherein said two joint shells (3, 4) each have on their inside a concentric cylinder ring (15, 16) rising from a shell bottom, wherein each of said two joint shells (3, 4) each have one encompassing receiving chamber (23) around each said cylinder ring (15, 16), and each said chamber together form a common, continuous receiving chamber (23) said cable (1) to be passed therethrough, and each said outrigger arm (5, 6) is continuously connected to said receiving chamber (23) by conduits (5a, 6a), each via a respective recess (24) in an associated joint shell of said two joint shells (3, 4), wherein the blocking device (9) has at least one stop (11), and both the blocking device (9) and stop (11) are completely contained within the cylindrical ring (15, 16).

2. The swivel joint of claim 1, wherein said blocking device (9) and said pushbutton (8) are pushed by a force of a compression spring (10) counter to said at least one stop (11) of a first shell (4) of said two joint shells into a position of repose in which said blocking device (9) engages said two joint shells (3, 4) in said blocking position, and upon actuation of said pushbutton (8) counter to said force of said compression spring (10), said blocking device (9) can be moved into a second shell of said two joint shells (3, 4) into said release position, for rotation of the joint shells (3, 4) counter to one another.

3. The swivel joint of claim 2 wherein said two joint shells (3, 4) and said blocking device (9) have intermeshing sets of teeth (12, 13, 14), said blocking device (9), having teeth (14) which mesh with teeth (12, 13) of said first shell and said second shell in said blocking position, and meshes with teeth (14) of said second shell (3), in said release position.

4. The swivel joint of claim 3, wherein each said cylinder ring has a set of axially parallel inner teeth (12, 13), said blocking device (9) being formed by a cylinder ring (9a) with axially parallel outer teeth (14) and an abutment rim (9b) on a face end to contain a compression spring (10), wherein said cylinder ring (9a) is displaceably engaged by said outer teeth (14) in said inner teeth (12, 13) of each said shell cylinder ring (15, 16) and said outer teeth (14) are axially no longer than said teeth (12) of said second shell (3) that receive the toothed cylinder ring (9a) in said release position.

5. The swivel joint of claim 3, wherein said intermeshing sets of teeth (12, 13, 14) are formed by identically finely spaced toothing.

6. The swivel joint of claim 2, wherein said blocking device (9) and said compression spring (10) are disposed coaxially with a pivot axis (2) of said two joint shells (3, 4), and said compression spring (10) is supported about said pivot axis (2) and rests in said blocking device (9) at one end on an inwardly retracted abutment rim (9b) of said blocking device (9) and at another end on said second shell (3) when receiving said release.

7. The swivel joint of claim 6, wherein said pivot axis (2) is formed by a concentric hollow connecting tang (17) on said second shell (3), and a hole (18), which surrounds said tang on a free end, said hole located on a false bottom (19) on said cylinder ring (16) of said first shell (4), said connecting tang (17) and said false bottom (19) rotatably joined by a connecting means, such as a screw, and at the same time forming a pivot and connecting axis for said two joint shells (3, 4).

8. The swivel joint of claim 7, wherein said false bottom (19), which is recessed relative to an outside of said first shell (4), forms a receptacle and motion chamber (20) in said first shell (4) for said pushbutton (8), said pushbutton (8) movably reaches with a plurality of detent hooks (21) through recesses (22) in said false bottom (19), said pushbutton (8) is supported, in said blocking position behind stops (11) in a region of said recesses (22).

9. The swivel joint of claim 8, wherein said pushbutton (8) is formed by a flat pressure head of circular outline, with three detent hooks (21), which are disposed uniformly distributed over a circumference of said pushbutton, protruding in the direction of said pivot axis, and which have abutment protrusions (21a) on their free ends.

10. The swivel joint of claim 9, wherein each of said two joint shells (3, 4), including each said tubular outrigger arm (5, 6), said cylinder ring (15, 16), said false bottom (19), said blocking device (9), said pushbutton (8), said detent hooks (21), are all formed integrally of plastic.

11. The swivel joint of claim 2, wherein said outrigger arm (5/6) is embodied as a conical or wedge-shaped part (26), formed onto each of said two joint shells (3/4), having an insertion hole (27) into which each of said pipe-shaped extension arms (7) are inserted.

12. The swivel joint of claim 1, wherein said two shells (3, 4) mesh with one another in a rotational guided manner with interlocking rims (25) formed onto abutting shell rims of said two joint shells.

13. The swivel joint of claim 1, wherein a medical hose is placed on the outside of a support arm of said swivel joint, which is detachably mounted on said support arm with a detent connection by retaining clamps and with said support arm and said swivel joint forms a unit.

14. The swivel joint of claim 1, wherein said outrigger arm (5/6) is formed by a formed-on tube connector, onto which one support segment (7) is slipped.

15. The swivel joint of claim 1, wherein said outrigger arm (5/6) is formed by a tube connector (28) and a bush (29) disposed around it, said tube connector (28) and said bush (29) are formed onto each of said two joint shells (3/4) and receive an inserted support tube segment (7) in an annular conduit (30) formed between said tube connector and said bush.

16. The swivel joint of claim 1, wherein said outrigger arm (5/6) is formed by a tube connector formed onto each of said two joint shells (3/4), and a support tube segment (7) makes a butt joint in front of said tube connector (5/6) and is retained on each of said two joint shells (3/4) by means of a cylindrical, longitudinally slit (32) spring tube (31) that is inserted into said tube connector (5/6) and said support tube segment (7) and has retaining protrusions (33) formed onto an outside.

17. The swivel joint of claim 1, wherein said outrigger arm (5/6) is formed by a tube connector formed onto each of said two joint shells (3/4), and a support tube segment (7) forms a butt joint in front of said tube connector (5/6) and is retained on each of said two joint shells (3/4) by means of a hose clamp (34), engaging the outside of said tube connector (5/6) and said support tube segment (7).

18. The swivel joint of claim 1, wherein said outrigger arm (5/6) of each of said two joint shells (3/4) is embodied by a formed-on tube connector (34) having a wall reinforcement (35) of asymmetrical cross section, into which said connector a support tube (7) is inserted.

19. The swivel joint of claim 18, wherein said wall reinforcement (35) rests on an outside of said swivel joint and merges smoothly, without forming a shoulder, with an outer circumference of each of said two joint shells (3/4).

20. The swivel joint of claim 19, wherein said tube connector (34), with said wall reinforcement (35), extends eccentrically around an insertion hole (36) for said support arm segment (7) and has an elliptical cross section.

* * * * *